United States Patent
Quach et al.

(10) Patent No.: US 10,473,331 B2
(45) Date of Patent: Nov. 12, 2019

(54) COMBUSTOR PANEL ENDRAIL INTERFACE

(71) Applicant: UNITED TECHNOLOGIES CORPORATION, Farmington, CT (US)

(72) Inventors: San Quach, Southington, CT (US); Jeffrey T. Morton, Manchester, CT (US); Matthew D. Parekh, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 205 days.

(21) Appl. No.: 15/599,159

(22) Filed: May 18, 2017

(65) Prior Publication Data

US 2018/0335211 A1 Nov. 22, 2018

(51) Int. Cl.
*F23R 3/00* (2006.01)
*F23R 3/06* (2006.01)

(52) U.S. Cl.
CPC ............ *F23R 3/002* (2013.01); *F23R 3/06* (2013.01); *F23R 2900/00012* (2013.01); *F23R 2900/00017* (2013.01); *F23R 2900/03041* (2013.01); *F23R 2900/03044* (2013.01)

(58) Field of Classification Search
None
See application file for complete search history.

(56) References Cited

U.S. PATENT DOCUMENTS

| 5,253,471 A | 10/1993 | Richardson |
| 6,029,455 A * | 2/2000 | Sandelis ............... F23R 3/002 60/752 |
| 7,886,541 B2 * | 2/2011 | Woolford ............... F23R 3/002 60/752 |
| 9,010,122 B2 | 4/2015 | Bangerter et al. |

(Continued)

FOREIGN PATENT DOCUMENTS

| EP | 1098141 | 5/2001 |
| EP | 2522907 | 11/2012 |

(Continued)

OTHER PUBLICATIONS

European Patent Office, European Search Report dated Oct. 16, 2018 in Application No. 18171584.8.

*Primary Examiner* — Steven M Sutherland
*Assistant Examiner* — Rodolphe Andre Chabreyrie
(74) *Attorney, Agent, or Firm* — Snell & Wilmer L.L.P.

(57) ABSTRACT

A combustor of a gas turbine engine may include a combustor shell, a first combustor panel coupled to the combustor shell, and a second combustor panel coupled to the combustor shell. The first combustor panel may have a first endrail and the second combustor panel may have a second endrail. An annular cooling cavity may be defined between the combustor shell and the first and second combustor panels and a channel may be defined between the first endrail and the second endrail, wherein direct line-of-sight through the channel from the annular cooling cavity to a combustor chamber is obstructed. Said differently, the inter- (Continued)

face between the adjacent endrails may be non-linear, in a direction from the annular cooling cavity to the combustor chamber.

17 Claims, 6 Drawing Sheets

(56) References Cited

U.S. PATENT DOCUMENTS

| | | | |
|---|---|---|---|
| 2010/0251722 A1* | 10/2010 | Woolford | F23R 3/002 |
| | | | 60/755 |
| 2015/0369490 A1 | 12/2015 | Cunha et al. | |
| 2016/0265772 A1 | 9/2016 | Eastwood et al. | |
| 2016/0290647 A1 | 10/2016 | Propheter-Hinckley et al. | |
| 2016/0377288 A1 | 12/2016 | Smith | |
| 2017/0241643 A1* | 8/2017 | Mulcaire | F23R 3/002 |

FOREIGN PATENT DOCUMENTS

| | | |
|---|---|---|
| EP | 3211319 | 8/2017 |
| FR | 2752916 | 3/1998 |

* cited by examiner

COMBUSTOR PANEL ENDRAIL INTERFACE

FIELD

The present disclosure relates to gas turbine engines, and more specifically, to combustors of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Combustors used in gas turbine engines rely on combustor panels as thermal shields and to guide combustion gases into the turbine. These combustor panels interface with hot combustion gases and are often susceptible to structural damage and/or oxidation caused by the high temperature of the combustion gases.

SUMMARY

In various embodiments, the present disclosure provides a combustor of a gas turbine engine. The combustor defines a combustor chamber and includes a first combustor panel and second combustor panel, according to various embodiments. The first combustor panel has a first endrail and the second combustor panel has a second endrail, according to various embodiments. An annular cooling cavity is defined at least partially by the first and second combustor panels and a channel is defined between the first endrail and the second endrail, wherein direct line-of-sight through the channel from the annular cooling cavity to the combustor chamber is obstructed, according to various embodiments.

In various embodiments, the combustor further includes a combustor shell and the first combustor panel and the second combustor panel are coupled to the combustor shell. In various embodiments, the first endrail and the second endrail have complementary geometries that form a shiplap interface. In various embodiments, a centerline axis of the channel extending from the annular cooling cavity to the combustor chamber is non-linear. The channel may include a first bend and a second bend. A first minor angle of the first bend is about 90 degrees and a second minor angle of the second bend is greater than about 90 degrees, according to various embodiments.

In various embodiments, at least one of the first endrail of the first combustor panel and the second endrail of the second combustor panel defines a rail impingement hole extending from the annular cooling cavity to the channel. The rail impingement hole may be configured to provide impingement cooling to the other of the first endrail and the second endrail. In various embodiments, the rail impingement hole extends in a direction that is parallel to the one of the first combustor panel and the second combustor panel. In various embodiments, at least one of the first endrail of the first combustor panel and the second endrail of the second combustor panel defines a rail effusion hole configured to provide effusion cooling to a combustion surface of the one of the first combustor panel and the second combustor panel. At least one of the first endrail and the second endrail may include a heat transfer pin extending therefrom and protruding into the channel.

Also disclosed herein, according to various embodiments, is a gas turbine engine that includes a combustor shell, a first combustor panel, and a second combustor panel. The combustor shell may include a diffuser side facing a diffuser chamber and a combustor side facing a combustor chamber. The first combustor panel may be coupled to the combustor side of the combustor shell and the first combustor panel may include a first endrail. The second combustor panel may be coupled to the combustor side of the combustor shell and the second combustor panel may include a second endrail. In various embodiments, an annular cooling cavity is defined between the combustor shell and the first and second combustor panels and a channel is defined between the first endrail and the second endrail, wherein direct line-of-sight through the channel from the annular cooling cavity to the combustor chamber is obstructed.

Also disclosed herein, according to various embodiments, is a method of assembling a gas turbine engine. The method includes coupling a first combustor panel to a combustor shell, the first combustor panel having a first endrail, according to various embodiments. The method may also include positioning a second combustor panel adjacent the first combustor panel such that a channel is defined between the first endrail of the first combustor panel and a second endrail of the second combustor panel. Direct line-of-sight through the channel from an annular cooling cavity defined between the combustor shell and the first and second combustor panels to a combustor chamber is obstructed, according to various embodiments. The method may also include coupling the second combustor panel to the combustor shell.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
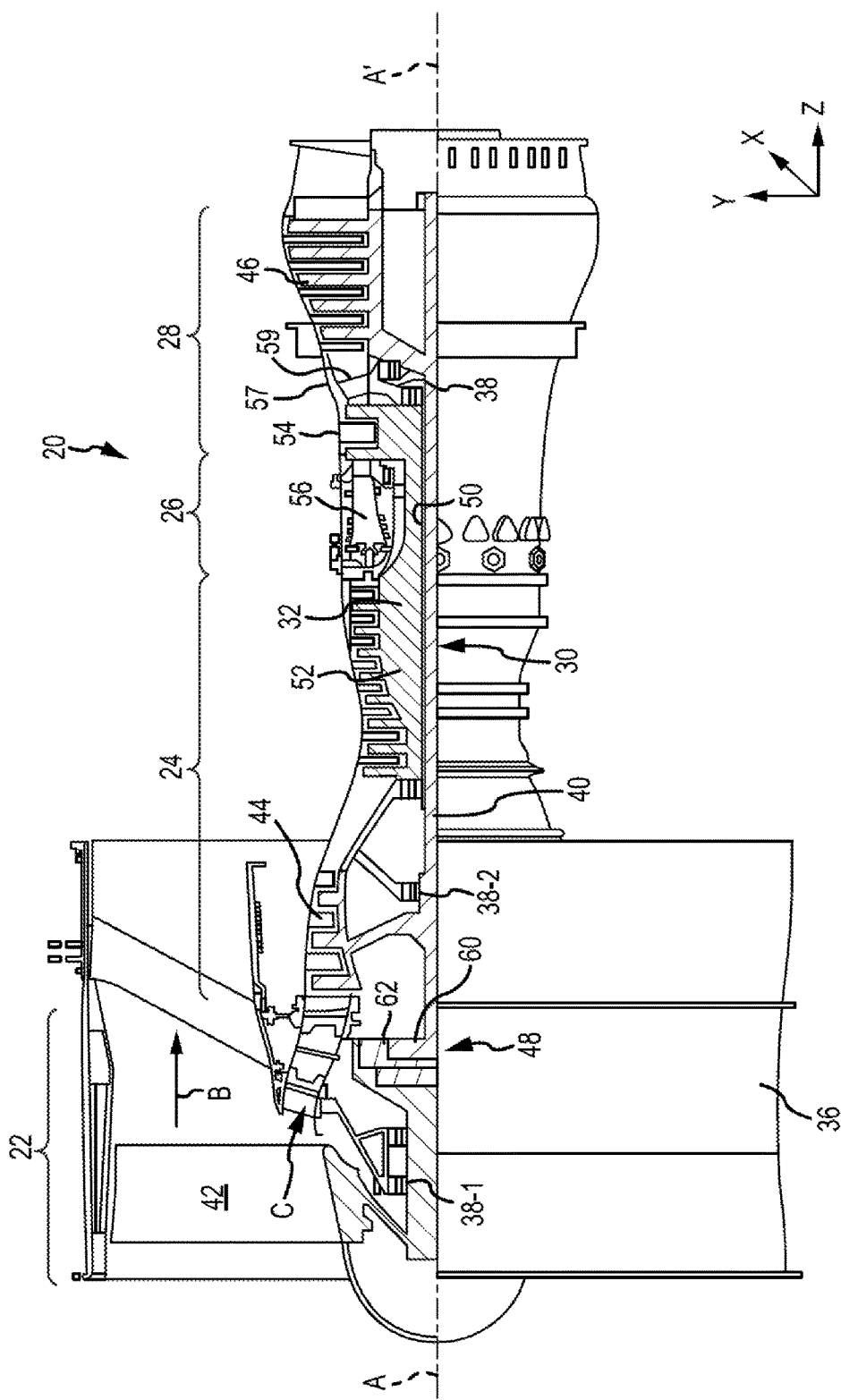
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
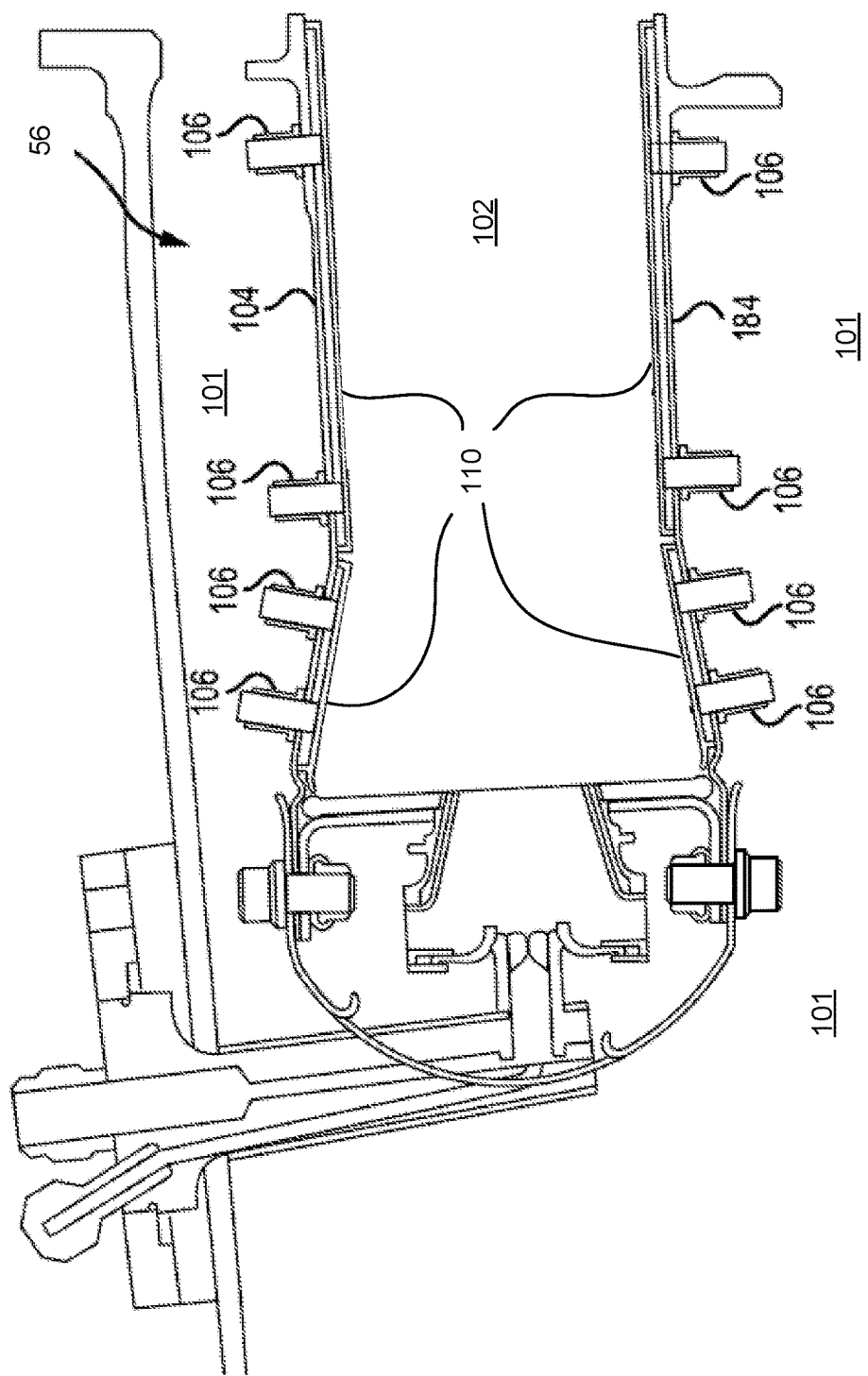
FIG. 2 illustrates a cross-sectional view of a combustor of a gas turbine engine, in accordance with various embodiments.

With reference to FIG. 2, an in accordance with various embodiments, one or more combustor panels 110 (e.g., thermal shields, combustor liners) may be positioned in combustor 56 to protect various features of the combustor 56 from the high temperature flames and/or combustion gases. The combustor 56, in various embodiments, may have a combustor chamber 102 defined by a combustor outer shell 104 and a combustor inner shell 184. A diffuser chamber 101 is external the combustor 56 and cooling air may be configured to flow through the diffuser chamber 101 around the combustor 56. The combustor chamber 102 may form a region of mixing of core airflow C (with brief reference to FIG. 1) and fuel, and may direct the high-speed exhaust gases produced by the ignition of this mixture inside the combustor 56. The combustor outer shell 104 and the combustor inner shell 184 may provide structural support to the combustor 56 and its components. For example, a combustor outer shell 104 and a combustor inner shell 184 may comprise a substantially cylindrical or a substantially conical canister portion defining an inner area comprising the combustor chamber 102.

As mentioned above, it may be desirable to protect the combustor outer shell 104 and the combustor inner shell 184 from the harmful effects of high temperatures. Accordingly, one or more combustor panels 110 may be disposed inside the combustor chamber 102 and may provide such protection. The combustor panels 110 may comprise a partial cylindrical or conical surface section. An outer combustor thermal panel may be arranged radially inward of the combustor outer shell 104, for example, circumferentially about the inner surface of the combustor outer shell 104 and one or more inner combustor panels may also be arranged radially outward of the combustor inner shell 184. The combustor panels 110 may comprise a variety of materials, such as metal, metal alloys, and/or ceramic matrix composites, among others With continued reference to FIG. 2 and as mentioned above, the combustor panels 110 may be mounted/coupled to the combustor shell 104/184 via one or more attachment features 106. The combustor panels 110 may be made of any suitable heat tolerant material. In this manner, the combustor panels 110 may be substantially resistant to thermal mechanical fatigue in order to inhibit cracking of the combustor panels 110 and/or to inhibit liberation of portions of the combustor panels 110. In various embodiments, the combustor panels 110 may be made from a nickel based alloy and/or a cobalt based alloy, among others. For example, the combustor panels 110 may be made from a high performance nickel-based super alloy. In various embodiments, the combustor panels 110 may be made from a cobalt-nickel-chromium-tungsten alloy.

The one or more attachment features 106 facilitate coupling and/or mounting the combustor panels 110 to the respective shells 104, 184 of the combustor 56. In various embodiments, the attachment features 106 may be a boss or a stud extending radially relative to the combustor panels 110. In various embodiments, the attachment feature 106 is a cylindrical boss, such as a threaded pin, or may be a rectangular boss, such as for receiving a clip, or may be any other apparatus whereby the combustor panel 110 is mounted to the combustor outer shell 104 or the combustor inner shell 184. In various embodiments, the attachment feature 106 comprises a threaded stud that extends through a corresponding aperture in the combustor outer shell 104 or the combustor inner shell 184, and is retained in position by an attachment nut disposed outward of the combustor outer shell 104 and torqued so that the attachment feature 106 is preloaded with a retaining force and securely affixes the combustor panel 110 in a substantially fixed position relative to the combustor outer shell 104 or the combustor inner shell 184.

As mentioned above, the high operating temperatures and pressure ratios of the combustion gases in the combustor section 26 may create operating environments that can damage various components of the combustor, such as the combustor panels, and thereby shorten the operational life of the combustor. The details of the present disclosure relate to a configuration of combustor panels that, according to various embodiments, tends to prevent or at least reduce damage, such as oxidation, of combustor panels. The details of the present disclosure may be implemented in new gas turbine engines/combustors and/or may be implemented to repair, retrofit, and/or otherwise modify existing gas turbine engines/combustors.

Figure 3:
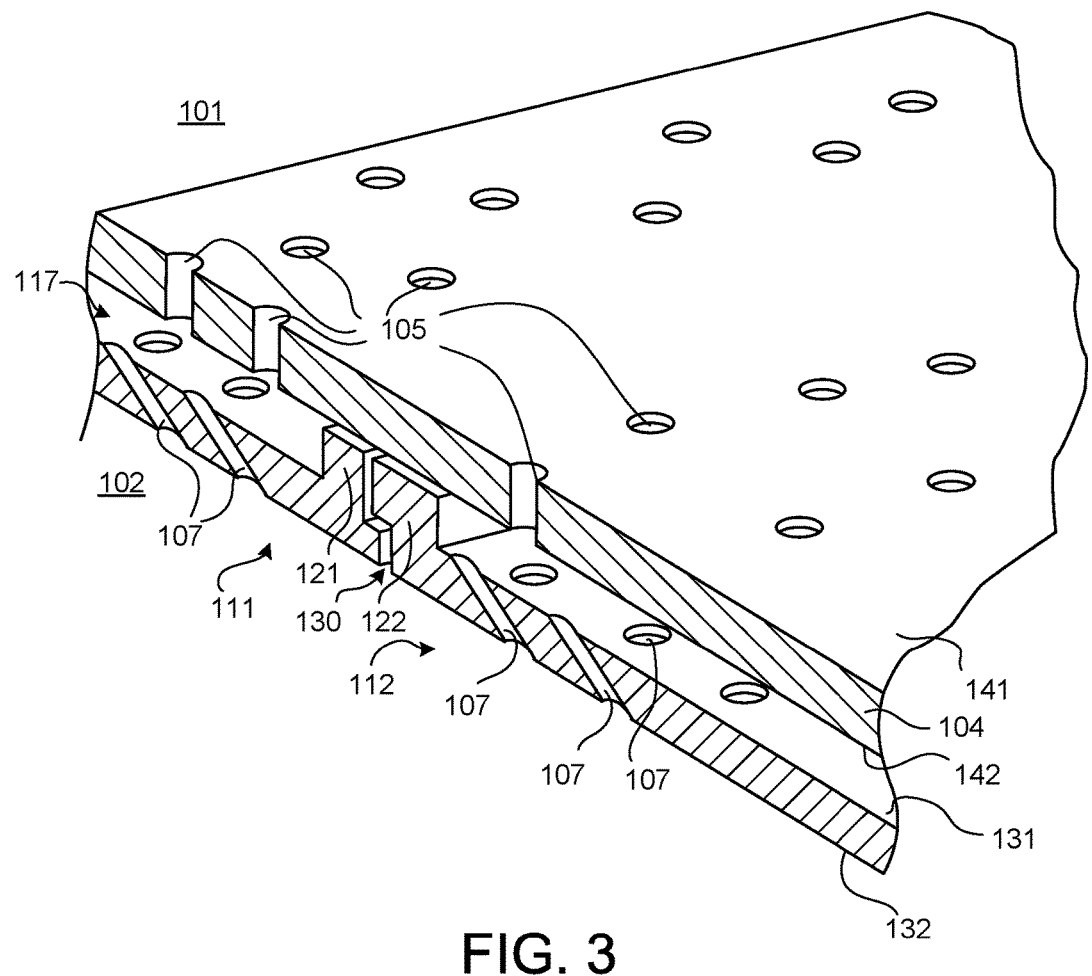
FIG. 3 illustrates a perspective cross-sectional view of a combustor shell and adjacent combustor panels, in accordance with various embodiments.

In various embodiments, and with reference to FIG. 3, an annular cooling cavity 117 is formed and/or defined between the combustor shell 104 and two adjacent combustor panels 110 (e.g., a first combustor panel 111 and a second combustor panel 112). As mentioned above, cooling air in the diffuser chamber 101 may enter the annular cooling cavity 117 via impingement holes 105 formed in the combustor shell 104. That is, impingement holes 105 may extend from a diffuser side 141 of the combustor shell 104 to a combustor side 142 of the combustor shell 104 and may supply cooling air to the annular cooling cavity 117. The cooling air in the annular cooling cavity 117 may enter the combustor chamber 102 via effusion holes 107 formed in the combustor panel. That is, effusion holes 107 may extend from a cooling surface or "cold side" 131 of the combustor panel to a combustion facing surface or "hot side" 132 of the combustor panel that is opposite the cold side 131. In various embodiments, the effusion holes 107 are generally oriented to create a protective "blanket" of air film over the hot side 132 of the combustor panel thereby protecting the combustor panel from the hot combustion gases in the combustor chamber 102.

In various embodiments, and with continued reference to FIG. 3, the first combustor panel 111 has a first endrail 121 and the second combustor panel 112 has a second endrail 122. A channel 130 may be defined between the first endrail 121 of the first combustor panel 111 and the second endrail 122 of the second combustor panel 112. The channel 130 may fluidly connect the annular cooling cavity 117 to the combustor chamber 102. Said differently, the cooling air may be configured to flow from the annular cooling cavity 117, through the channel 130, and into the combustor chamber 102. In various embodiments, direct line-of-sight through the channel 130, from the annular cooling cavity 117 to the combustor chamber 102 is obstructed. That is, the configuration of the adjacent endrails 121, 122 of the combustor panels 111, 112 eliminates line-of-sight between the annular cooling cavity 117 and the combustor chamber 102, according to various embodiments. Such a configuration, according to various embodiments, tends to enhance the heat transfer at the endrails 121, 122, thereby improving durability of the combustor, prolonging the useful life of the combustor, and/or enabling operation at higher temperatures than would otherwise be possible.

In various embodiments, the first and second combustor panels 111, 112 are axially adjacent and thus the channel 130 axially separates the first combustor panel 111 (e.g., a forward panel) from the second combustor panel 112 (e.g., an aft panel). In various embodiments, the first and second combustor panels 111, 112 are circumferentially adjacent and thus the channel 130 circumferentially separates the first combustor panel 111 from the second combustor panel 112.

In various embodiments, the first endrail 121 and the second endrail 122 have complementary geometries that form a shiplap interface, thereby obstructing/eliminating line-of-sight, as described above. For example, a centerline axis of the channel 130 extending from the annular cooling cavity 117 to the combustor chamber 102 is non-linear. In various embodiments, and with reference to FIG. 4A, a portion of the second endrail 122 may be disposed between a portion of the first endrail 121 and the combustor shell 104. Thus, for example, a first gap, which may be a portion of the annular cooling cavity 117, may be defined between the combustor shell 104 and a portion of the second endrail 122 of the second combustor panel 112 and a second gap, which is a portion of the channel 130, may be defined between the portion of the second endrail 122 of the second combustor panel 112 and a portion of the first endrail 121 of the first combustor panel 111.

In various embodiments, the non-linear channel 130 has at least two bends (e.g., a first bend 133 and a second bend 134). The bends 133, 134 create a tortuous fluid pathway between the annular cooling cavity 117 and the combustor chamber 102, thereby enhancing heat transfer cooling at the endrails 121, 122. Because the obstructed/eliminated line-of-sight through the non-linear channel 130 is present, the convective cooling of the endrails 121,122 may be improved and/or the cooling air passing through the channel 130 and entering the combustor chamber 102 may be conditioned (e.g., directed). For example, and according to various embodiments, the cooling air passing through channel 130 may have improved surface attachment properties and may enhance effusion cooling of the hot side 132 of the combustor panels 111, 112 by enhancing the protective "blanket" of air film over the hot side 132 of the combustor panels 111, 112.

In various embodiments, a first minor angle of the first bend 133 and a second minor angle of the second bend 134 are both about 90 degrees. In various embodiments, and with momentary reference to FIG. 4B, the first minor angle of the first bend 133 is about 90 degrees and the second minor angle of the second bend 134 is greater than about 90 degrees. As used in this context only, the term "about" means plus or minus 5 degrees.

Figure 4A:
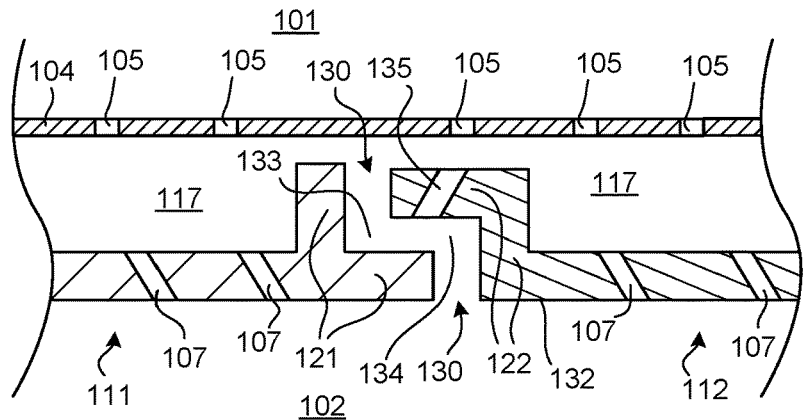
FIGS. 4A, 4B, 4C, 4D, 4E, and 4F illustrate cross-sectional views of a combustor shell and adjacent combustor panels, in accordance with various embodiments.

In various embodiments, and with continued reference to FIG. 4A, at least one of the endrails 121, 122 may define a rail hole 135. The rail hole 135, according to various embodiments, extends through at least one of the endrails 121, 122 from the annular cooling cavity 117 to the channel 130. The rail hole 135 may be a rail impingement hole that is configured to provide impingement cooling to the endrails 121, 122 or the rail hole 135 may be a rail effusion hole that is configured to provide effusion cooling to a combustion surface (e.g., hot side 132). For example, and with reference to FIG. 4A, the rail hole 135 may extend through a portion of the second endrail 122 of the second combustor panel 112 to deliver cooling air to a portion of the first endrail 121 of the first combustor panel 111. In various embodiments, and with continued reference to FIG. 4A, the rail impingement hold 135 has a canted orientation, relative to the combustor shell 104 and/or the combustor panels 111, 112. In various embodiments, and with reference to FIG. 4C, the rail impingement hole 135 may be substantially perpendicular to one or both of the first and second combustor panels 111, 112. In various embodiments, and with reference to FIG. 4F, the rail impingement hole 135 may be substantially parallel to one or both of the first and second combustor panels 111, 112. In various embodiments, and with reference to FIG. 4B, the endrails 121, 122 are free of rail holes.

Figure 4B:
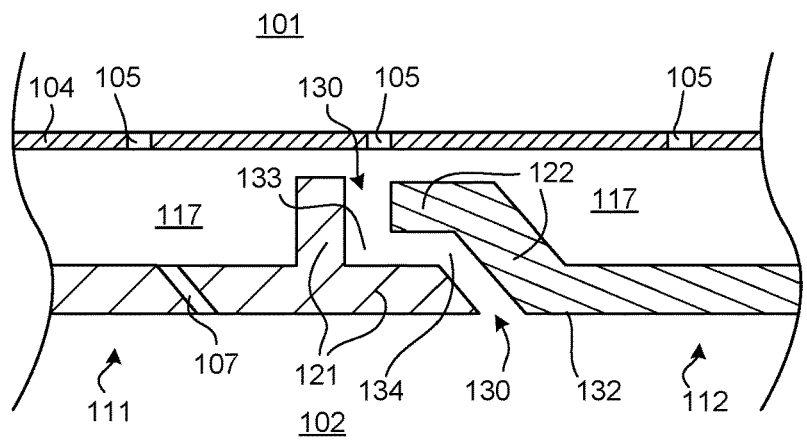
Figure 4C:
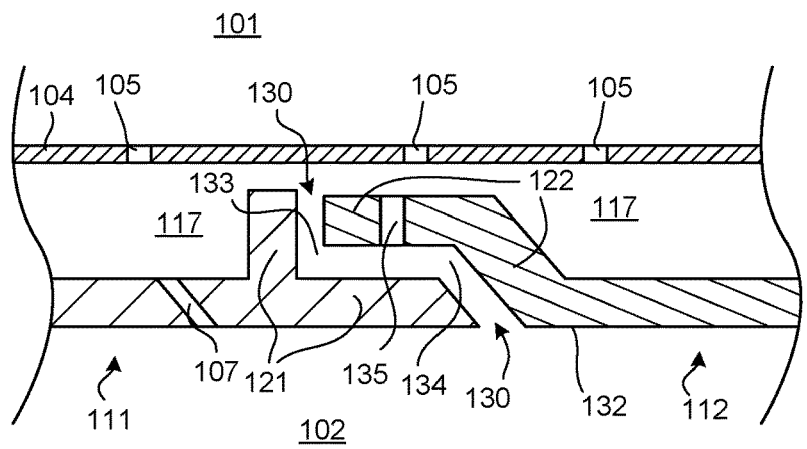

In various embodiments, and with reference to FIGS. 4B and 4C, the first endrail 121 and the second endrail 122 may define a channel 130 that has a canted portion that helps to guide and/or direct the cooling air. For example, as mentioned above, the second bend 134 may be greater than 90 degrees to improved surface attachment of the cooling air to the hot side 132 of, for example, the second combustor panel 112 (e.g., an aft combustor panel) properties and thus may enhance effusion cooling of the hot side 132 of the second combustor panel 112 by enhancing the protective air film over the hot side 132 of the second combustor panel 112.

Figure 4D:
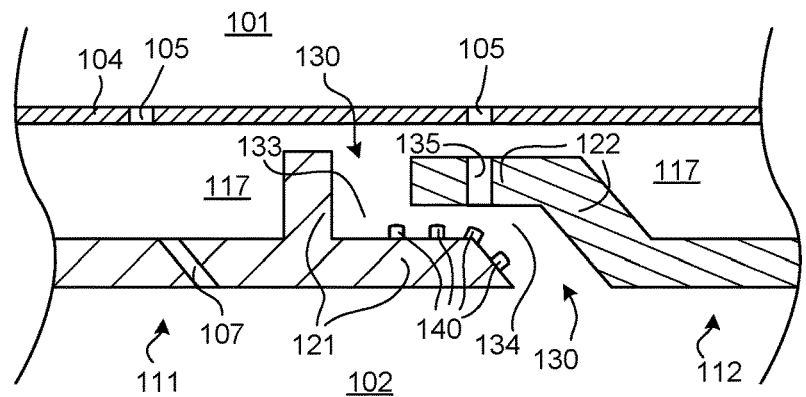

In various embodiments, and with reference to FIG. 4D, at least one of the first endrail 121 of the first combustor panel 111 and the second endrail 122 of the second combustor panel 112 has one or more heat transfer pins 140 extending therefrom and protruding into the channel 130. The one or more heat transfer pins 140 may further obstruct line-of-sight, may increase the surface area of the channel available for heat transfer, and may otherwise augment the heat transfer cooling of the endrails 121, 122. The heat transfer pins 140 may have various cross-sectional shapes, such as cylindrical, rectangular, or other polygonal shape.

Figure 4E:
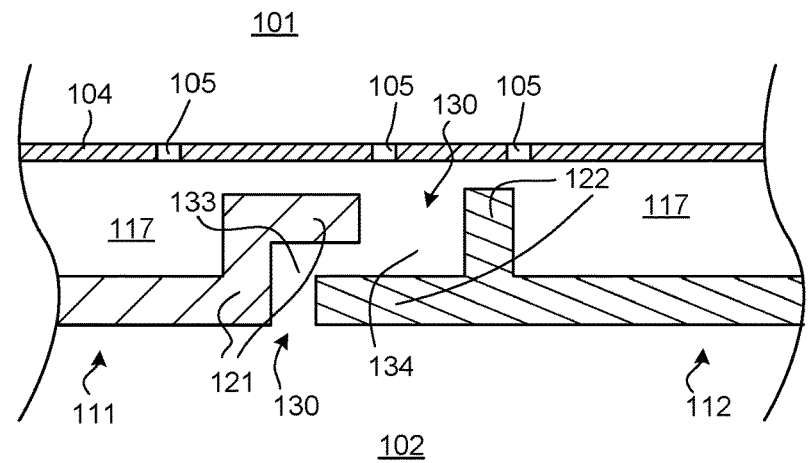
Figure 4F:
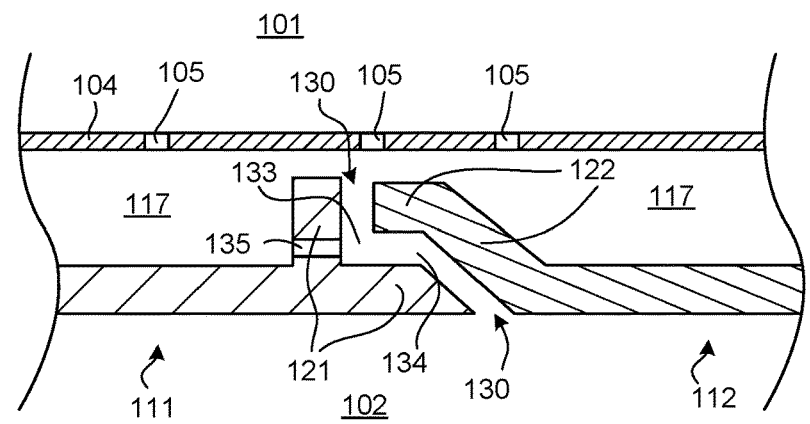

In various embodiments, the shiplap interface of the endrails 121, 122 of the two adjacent combustor panels 111, 112 may have an alternative configuration than what is depicted in FIG. 4A. For example, and with reference to FIG. 4E, a portion of the first endrail 121 may be disposed between a portion of the first endrail 122 and the combustor shell 104. Thus, for example, a first gap, which may be a portion of the annular cooling cavity 117, may be defined between the combustor shell 104 and a portion of the first endrail 121 of the first combustor panel 111 and a second gap, which is a portion of the channel 130, may be defined between the portion of the first endrail 121 of the first combustor panel 111 and a portion of the second endrail 122 of the second combustor panel 112.

Figure 5:
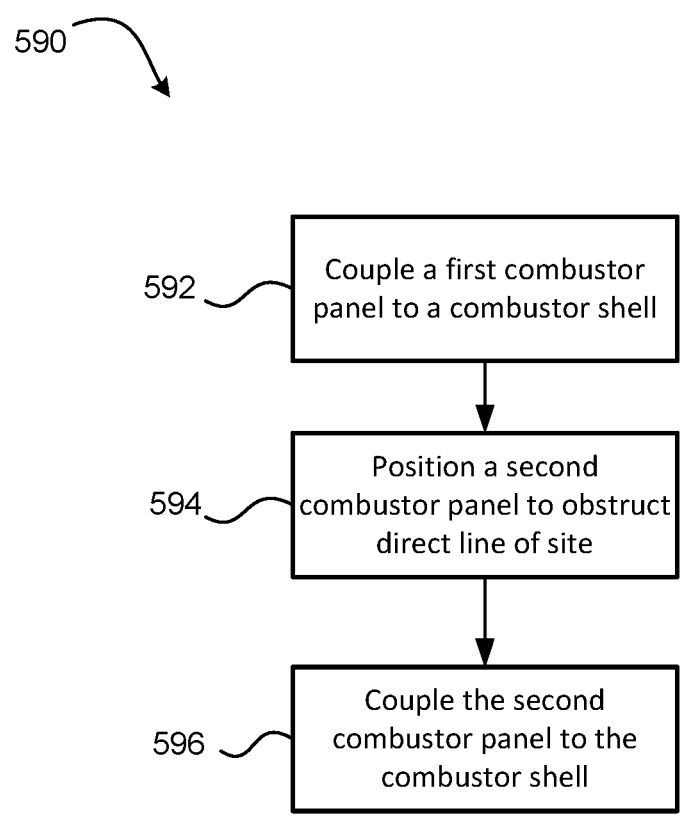
FIG. 5 is a schematic flowchart diagram of a method of assembling a gas turbine engine, in accordance with various embodiments.

In various embodiments, and with reference to FIG. 5, a method 590 of assembling a gas turbine engine is provided. The method 590 may include coupling a first combustor panel to a combustor shell at step 592, positioning a second combustor panel to obstruct direct line of sight at step 594, and coupling the second combustor panel to the combustor shell at step 596. The first combustor panel may include a first endrail and the second combustor panel may include a second endrail. In various embodiments, positioning the second combustor panel at step 594 includes positioning second endrail adjacent the first endrail such that a channel is defined between the first endrail and the second endrail. Direct line-of-sight through the channel from an annular cooling cavity defined between the combustor shell and the first and second combustor panels may be obstructed. For example, the complimentary configuration of the adjacent endrails eliminates direct line-of-sight through the channel, according to various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor of a gas turbine engine, the combustor comprising a combustor shell defining a combustor chamber, the combustor comprising:
 a first combustor panel coupled to the combustor shell, the first combustor panel comprising a first endrail; and
 a second combustor panel coupled to the combustor shell, the second combustor panel comprising a second endrail; wherein:
  an annular cooling cavity is defined between the combustor shell and the first and second combustor panels;
  a channel is defined between the first endrail and the second endrail;
  a first gap is defined between the combustor shell and a first surface of the first endrail closest to the combustor shell, and having a first distance;
  a second gap is defined between the combustor shell and a second surface of the second endrail closest to the combustor shell, and having a second distance being the same as the first distance;
  the annular cooling cavity is fluidly connected to the channel via the first gap and the second gap such that the channel fluidly connects the annular cooling cavity to the combustor chamber; and
  direct line-of-sight through the channel from at least one of the first gap and the second gap to the combustor chamber is obstructed such that a centerline axis of the channel extending from at least one of the first gap and the second gap to the combustor chamber is non-linear.

2. The combustor of claim 1, wherein the first endrail and the second endrail have complementary geometries that form a shiplap interface.

3. The combustor of claim 1, wherein the centerline axis of the channel comprises a first bend and a second bend.

4. The combustor of claim 3, wherein a first minor angle of the first bend measured between the center-axis line and a first tangent line of the first bend is about 90 degrees and a second minor angle of the second bend measured between the center-axis line and a second tangent line of the second bend is greater than about 90 degrees.

5. The combustor of claim 1, wherein at least one of the first endrail of the first combustor panel and the second endrail of the second combustor panel defines a rail impingement hole extending from the annular cooling cavity to the channel configured to provide impingement cooling to the other of the first endrail and the second endrail.

6. The combustor of claim 5, wherein the rail impingement hole extends in a direction that is substantially parallel to the one of the first combustor panel and the second combustor panel.

7. The combustor of claim 5, wherein the rail impingement hole extends in a direction that is substantially perpendicular to the one of the first combustor panel and the second combustor panel.

8. The combustor of claim 1, wherein at least one of the first endrail of the first combustor panel and the second endrail of the second combustor panel defines a rail effusion hole configured to provide effusion cooling to a combustion surface of the at least one of the first combustor panel and the second combustor panel.

9. The combustor of claim 1, wherein at least one of the first endrail and the second endrail comprises a heat transfer pin extending therefrom and protruding into the channel.

10. A gas turbine engine comprising:
 a combustor shell comprising a diffuser side facing a diffuser chamber and a combustor side facing a combustor chamber;
 a first combustor panel coupled to the combustor side of the combustor shell, the first combustor panel comprising a first endrail; and a second combustor panel coupled to the combustor side of the combustor shell, the second combustor panel comprising a second endrail; wherein
an annular cooling cavity is defined between the combustor shell and the first and second combustor panels and a channel is defined between the first endrail and the second endrail, wherein
a first gap is defined between the combustor shell and a first surface of the first endrail closest to the combustor shell, and having a first distance,
a second gap is defined between the combustor shell and a second surface of the second endrail closest to the combustor shell, and having a second distance being the same as the first distance, and
the annular cooling cavity is fluidly connected to the channel via the first gap and the second gap such that the channel fluidly connects the annular cooling cavity to the combustor chamber, wherein direct line-of-sight through the channel from the annular cooling cavity to the combustor chamber is obstructed such that a centerline axis of the channel extending from at least one of the first gap and the second gap to the combustor chamber is non-linear.

11. The gas turbine engine of claim 10, wherein the first endrail and the second endrail have complementary geometries that form a shiplap interface.

12. The gas turbine engine of claim 10, wherein the centerline axis of the channel comprises a first bend and a second bend.

13. The combustor of claim 3, wherein a first minor angle of the first bend measured between the center-axis line and a first tangent line of the first bend is about 90 degrees and a second minor angle of the second bend measured between the center-axis line and a second tangent line of the second bend is greater than about 90 degrees.

14. The gas turbine engine of claim 10, wherein at least one of the first endrail of the first combustor panel and the second endrail of the second combustor panel defines a rail impingement hole extending from the annular cooling cavity to the channel and configured to provide impingement cooling to the other of the first endrail and the second endrail.

15. The gas turbine engine of claim 14, wherein the rail impingement hole extends in a direction that is substantially perpendicular to a panel direction of the first combustor panel and the second combustor panel.

16. The gas turbine engine of claim 10, wherein at least one of the first endrail and the second endrail comprises a heat transfer pin extending therefrom and protruding into the channel.

17. A method of assembling a gas turbine engine, the method comprising:
coupling a first combustor panel to a combustor shell, the first combustor panel comprising a first endrail, wherein
a first gap is defined between the combustor shell and a first surface of the first endrail closest to the combustor shell, and having a first distance;
positioning a second combustor panel adjacent the first combustor panel such that a channel is defined between the first endrail of the first combustor panel and a second endrail of the second combustor panel, wherein direct line-of-sight through the channel from an annular cooling cavity defined between the combustor shell and the first and second combustor panels to a combustor chamber is obstructed; and
coupling the second combustor panel to the combustor shell, wherein
a second gap is defined between the combustor shell and a second surface of the second endrail closest to the combustor shell, and having a second distance being the same as the first distance, and
a centerline axis of the channel extending from at least one of the first gap and the second gap to the combustor chamber is non-linear.

\* \* \* \* \*